(12) United States Patent
Sonoda et al.

(10) Patent No.: US 9,725,018 B2
(45) Date of Patent: Aug. 8, 2017

(54) SEAT DEVICE FOR A VEHICLE

(71) Applicant: KUBOTA CORPORATION, Osaka (JP)

(72) Inventors: Shunsuke Sonoda, Osaka (JP); Yoshihisa Tahara, Sakai (JP)

(73) Assignee: KUBOTA CORPORATION, Osaka (JP)

(*) Notice: Subject to any disclaimer, the term of this patent is extended or adjusted under 35 U.S.C. 154(b) by 153 days.

(21) Appl. No.: 14/663,967

(22) Filed: Mar. 20, 2015

(65) Prior Publication Data

US 2015/0367761 A1 Dec. 24, 2015

(30) Foreign Application Priority Data

Jun. 23, 2014 (JP) .................. 2014-127858

(51) Int. Cl.
*B60N 2/38* (2006.01)
*B60N 2/30* (2006.01)

(52) U.S. Cl.
CPC ......... *B60N 2/3045* (2013.01); *B60N 2/3025* (2013.01); *B60N 2/38* (2013.01)

(58) Field of Classification Search
CPC ....... B60N 2/3045; B60N 2/38; B60N 2/3025
USPC .......................... 297/331, 335, 332
See application file for complete search history.

(56) References Cited

U.S. PATENT DOCUMENTS

| | | | | |
|---|---|---|---|---|
| 1,355,005 A | * | 10/1920 | Schechter | B61D 33/0085 297/14 |
| 1,685,137 A | * | 9/1928 | Nichols | A47C 9/06 248/240.4 |
| 1,778,124 A | * | 10/1930 | Sauer | A47B 3/0916 108/132 |
| 2,031,287 A | | 2/1936 | Swanson | |
| 2,173,569 A | * | 9/1939 | Troendle | B60N 3/004 108/134 |
| 2,258,119 A | * | 10/1941 | Mathe | B60N 2/34 297/284.1 |
| 3,778,103 A | * | 12/1973 | Edwards | B60N 2/242 297/331 |
| 4,025,108 A | * | 5/1977 | Leighty | B60N 2/38 297/335 |

(Continued)

FOREIGN PATENT DOCUMENTS

| | | |
|---|---|---|
| FR | 360231 A | 4/1906 |
| JP | 2008-273448 | 11/2008 |

*Primary Examiner* — David R Dunn
(74) *Attorney, Agent, or Firm* — Greenblum & Bernstein, P.L.C.

(57) ABSTRACT

A seat device includes a seat part that is capable of changing a posture to a use posture that allows sitting on the seat part and to a non-use posture that does not allow sitting on the seat part. A seat support can support the seat part in a state in which the seat part has been changed to the use posture. A guide member has a free groove that slidably guides a sliding part of the seat support and a regulation groove that regulates sliding of the sliding part in a state in which the seat part has been changed to the use posture. The guide member can be fixed on the seat part. A spring biases the seat support so that the sliding part is held in the regulation groove in the state in which the seat part has been changed to the use posture. A lever may cause the sliding part to slide from the regulation groove to the free groove and allow the seat support to swing downward.

20 Claims, 11 Drawing Sheets

(56) References Cited

U.S. PATENT DOCUMENTS

| | | | | |
|---|---|---|---|---|
| 4,460,215 A * | 7/1984 | Chamberlain | A47C 9/06 | 297/14 |
| 4,700,989 A * | 10/1987 | Ercilla | B60N 2/01583 | 248/501 |
| 5,288,128 A * | 2/1994 | Smith | A47C 1/121 | 297/248 |
| 5,529,378 A * | 6/1996 | Chaban | B60N 2/01508 | 297/331 |
| 5,800,015 A * | 9/1998 | Tsuchiya | B60N 2/0715 | 248/430 |
| 6,030,037 A * | 2/2000 | Ritch | A47C 3/04 | 297/239 |
| 6,039,401 A * | 3/2000 | Rus | B60N 2/01583 | 296/65.03 |
| 6,220,616 B1 * | 4/2001 | Finch | A61G 5/125 | 280/304.1 |
| 6,343,834 B1 * | 2/2002 | Wurmlinger | A47C 9/06 | 108/134 |
| 6,572,187 B2 * | 6/2003 | Laufer | A47C 9/06 | 297/217.1 |
| 6,684,540 B1 * | 2/2004 | Tufts | D06F 81/06 | 38/137 |
| 6,698,834 B2 * | 3/2004 | Olarte | A47C 7/56 | 297/331 |
| 6,807,690 B1 * | 10/2004 | Satterfield | A47K 3/282 | 297/14 |
| 6,883,868 B2 * | 4/2005 | Yoshida | B60N 2/065 | 296/65.13 |
| 6,916,057 B2 | 7/2005 | Teich | | |
| 7,134,725 B2 * | 11/2006 | Hofmann | B60N 2/2245 | 296/65.01 |
| 7,651,160 B2 * | 1/2010 | Okumura | B60N 3/004 | 108/42 |
| 7,914,078 B2 * | 3/2011 | Hentges | B60N 2/163 | 297/331 |
| 7,976,093 B2 * | 7/2011 | McBride | B60N 2/3047 | 296/65.05 |
| 8,287,024 B2 * | 10/2012 | Sayama | B60N 2/2356 | 296/65.03 |
| 8,985,691 B2 * | 3/2015 | Tsuruta | B60N 2/2356 | 297/331 |
| 9,283,881 B2 * | 3/2016 | Evels | B60N 3/004 | |
| 2003/0085602 A1 * | 5/2003 | Ogino | B60N 2/1839 | 297/331 |
| 2004/0113410 A1 * | 6/2004 | Morino | B60N 2/3011 | 280/808 |
| 2004/0164598 A1 * | 8/2004 | Teich | B60N 2/3045 | 297/335 |
| 2005/0077770 A1 * | 4/2005 | Lang | B60N 2/36 | 297/331 |
| 2006/0152055 A1 * | 7/2006 | Yudovich | B60N 2/0155 | 297/331 |
| 2006/0255637 A1 * | 11/2006 | O'Connor | B60N 2/01583 | 297/331 |
| 2007/0035166 A1 * | 2/2007 | Summerford | A47C 9/06 | 297/331 |
| 2008/0122279 A1 * | 5/2008 | Park | B60N 2/01 | 297/332 |
| 2008/0211281 A1 * | 9/2008 | Grable | B60N 2/305 | 297/331 |
| 2008/0224520 A1 * | 9/2008 | Veluswamy | B60N 2/335 | 297/335 |
| 2010/0270839 A1 * | 10/2010 | Moegling | B60N 2/20 | 297/332 |
| 2013/0038108 A1 * | 2/2013 | Hayakawa | B60N 2/065 | 297/332 |

\* cited by examiner ively incorporated by reference herein in its entirety.

BACKGROUND OF THE INVENTION

1. Field of the Invention

The present invention relates to a seat device that is provided with a seat part that is upward-and-downward swingably supported and is capable of changing a posture thereof to a use posture that allows sitting on the seat part and to a non-use posture that does not allow sitting on the seat part.

2. Description of Related Art

Conventionally, a seat device is provided in a cabin of a work vehicle such as a tractor for a person other than a driver driving the work vehicle to sit. The seat device has a seat part that is capable of changing a posture thereof to a use posture that allows sitting on the seat part and to a non-use posture that does not allow sitting on the seat part, for example, as described in Japanese Patent Laid-Open Publication No. 2008-273448.

The seat device described in Japanese Patent Laid-Open Publication No. 2008-273448 includes a seat part that is capable of changing a posture thereof to a use posture that allows sitting on the seat part and to a non-use posture that does not allow sitting on the seat part, a guide plate that is fixed on the seat part, a seat support that swings along with swinging of the seat part, and a lock member that is provided on the seat support and holds the seat part in the use posture. A guide groove in which a part of the seat support slides, a counterbore part that is arranged at a middle part of the guide groove and is capable of engaging the lock member, and a locking hole that is arranged at a position spaced apart from the guide groove and is capable of engaging the lock member, are formed in the guide plate.

In the seat device, the seat part is held in the non-use posture by engaging the lock member by inserting the lock member to the counterbore part. In the seat device, the seat part is held in the use posture by engaging the lock member by inserting the lock member to the locking hole.

In the seat device as described above, when the seat part is changed from the use posture to the non-use posture, it is necessary to swing the seat part after the lock member is pulled out from the locking hole and, thereafter, insert the lock member to the counterbore part.

As described above, in the seat device, when the seat part is changed from the use posture to the non-use posture, it is necessary to extract and insert the lock member with respect to the counterbore part and the locking hole, so the posture cannot be easily changed.

SUMMARY OF THE INVENTION

The present invention is accomplished in view of the situation described above and provides a seat device that allows a seat part to be easily changed from a use posture to a non-use posture.

A problem to be solved by the present invention is as described above. A solution to the problem is described in the following.

According to one aspect of the present invention, a seat device includes: a seat part that is upward-and-downward swingably supported and is capable of changing a posture thereof to a use posture that allows sitting on the seat part and to a non-use posture that does not allow sitting on the seat part; a support part that is upward-and-downward swingably supported and supports the seat part in a state in which the seat part has been changed to the use posture; a guide part in which a free groove that slidably guides a predetermined portion of the support part and a regulation groove that regulates sliding of the predetermined portion in the state in which the seat part has been changed to the use posture are formed, the guide part being fixed on the seat part; a biasing member that biases the support part so that the predetermined portion is held in the regulation groove in the state in which the seat part has been changed to the use posture; and a release member that causes the predetermined portion to slide from the regulation groove to the free groove by causing the support part to swing in a first direction against a biasing force of the biasing member.

According to another aspect of the present invention, a first groove and a second groove are formed in the regulation groove. The first groove regulates, at a first end thereof, sliding of the predetermined portion and guides the predetermined portion to slide from the first end to a second end accompanying upward swinging of the seat part that is in the state in which the seat part has been changed to the use posture. The second groove guides the predetermined portion to slide from an end that is connected to the second end of the first groove to an end that is connected to the free groove accompanying swinging of the support part in the first direction due to the release member.

According to another aspect of the present invention, the biasing member biases the support part so that the predetermined portion is held in the free groove in the state in which the seat part has been changed to the non-use posture.

According to another aspect of the present invention, the release member is arranged near an outer edge of the seat part and has an operation part that is operated by a worker.

According to another aspect of the present invention, a seat device includes: a seat part that is upward-and-downward swingably supported and is capable of changing a posture thereof to a use posture that allows sitting on the seat part and to a non-use posture that does not allow sitting on the seat part; a support part that is upward-and-downward swingably supported and supports the seat part in the state in which the seat part has been changed to the use posture; a guide part that is formed to extend in a predetermined direction, has a groove capable of changing the seat part to the use posture and to the non-use posture by slidably guiding a predetermined portion of the support part, and is fixed on the seat part; and a biasing member that biases the support part toward a swinging position at which the support part can support the seat part in the state in which the seat part has been changed to the use posture. In a state in which the seat part has been changed to the use posture, a direction along which a biasing force acts on the predetermined portion due to the biasing member and a formation direction of the groove are different.

Effects of the present invention include the following.

According to one aspect of the present invention, the seat part can be easily changed from the use posture to the non-use posture.

According to another aspect of the present invention, the seat part can be reliably held in the use posture.

According to another aspect of the present invention, the seat part can be stably held in the non-use posture.

According to another aspect of the present invention, the seat part can be more easily changed from the use posture to the non-use posture.

According to another aspect of the present invention, the seat part can be reliably held in the use posture.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7A is a side view and FIG. 7B is an enlarged side view illustrating the guide member and the sliding part;

FIG. 8A is a side view and FIG. 8B is an enlarged side view illustrating the guide member and the sliding part;

FIG. 9A is a side view and FIG. 9B is an enlarged side view illustrating the guide member and the sliding part;

FIG. 10A is a side view of the seat device and FIG. 10B is an enlarged side view.

DETAILED DESCRIPTION OF THE INVENTION

Figure 1:
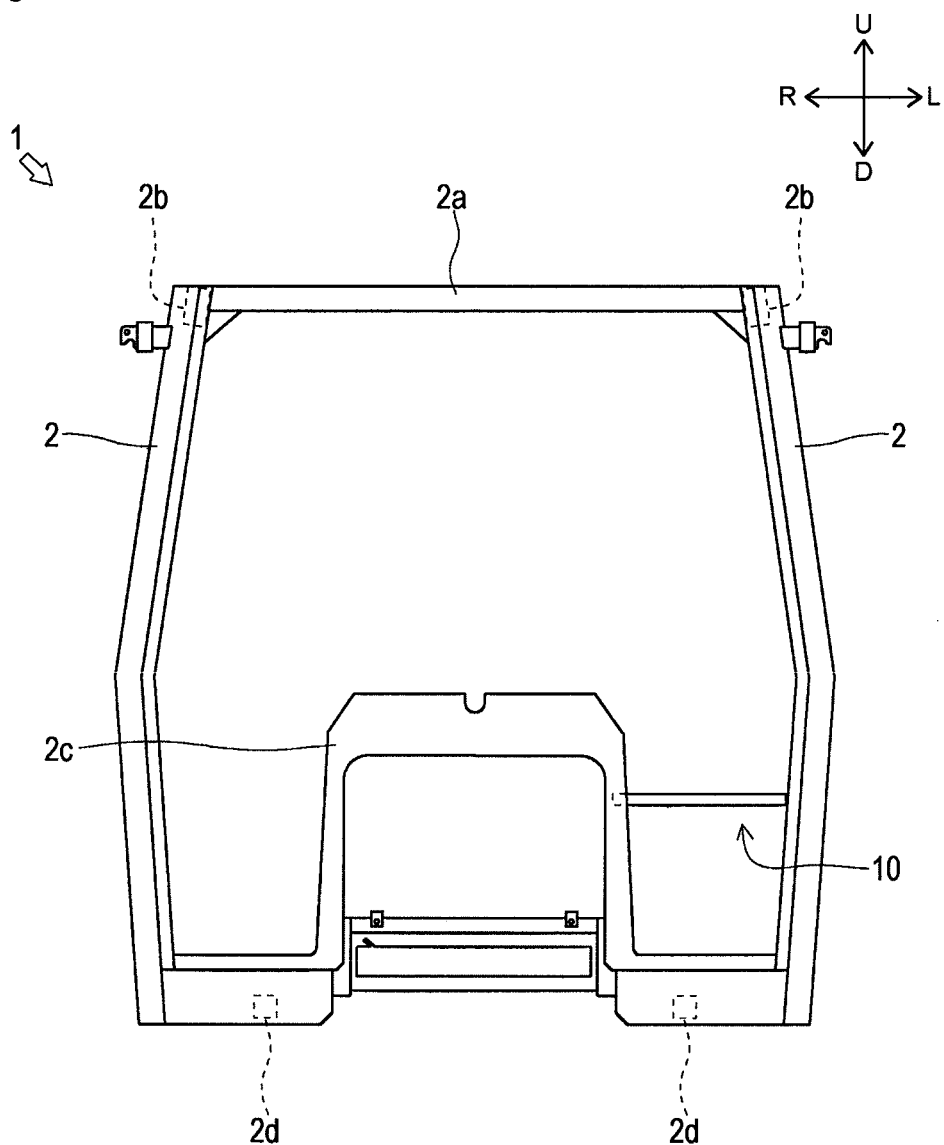
FIG. 1 is a front view illustrating a cabin frame in which a seat device is provided.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, a seat device 10 of the present embodiment is described.

In the following description, an up-down direction is defined with an arrow U direction indicated in the drawings as an upward direction and an arrow D direction as a downward direction. A left-right direction is defined with an arrow L direction indicated in the drawings as a leftward direction and an arrow R direction as a rightward direction. Also, a front-rear direction is defined with an arrow F direction indicated in the drawings as a forward direction and an arrow B direction as a rearward direction.

Figure 2:
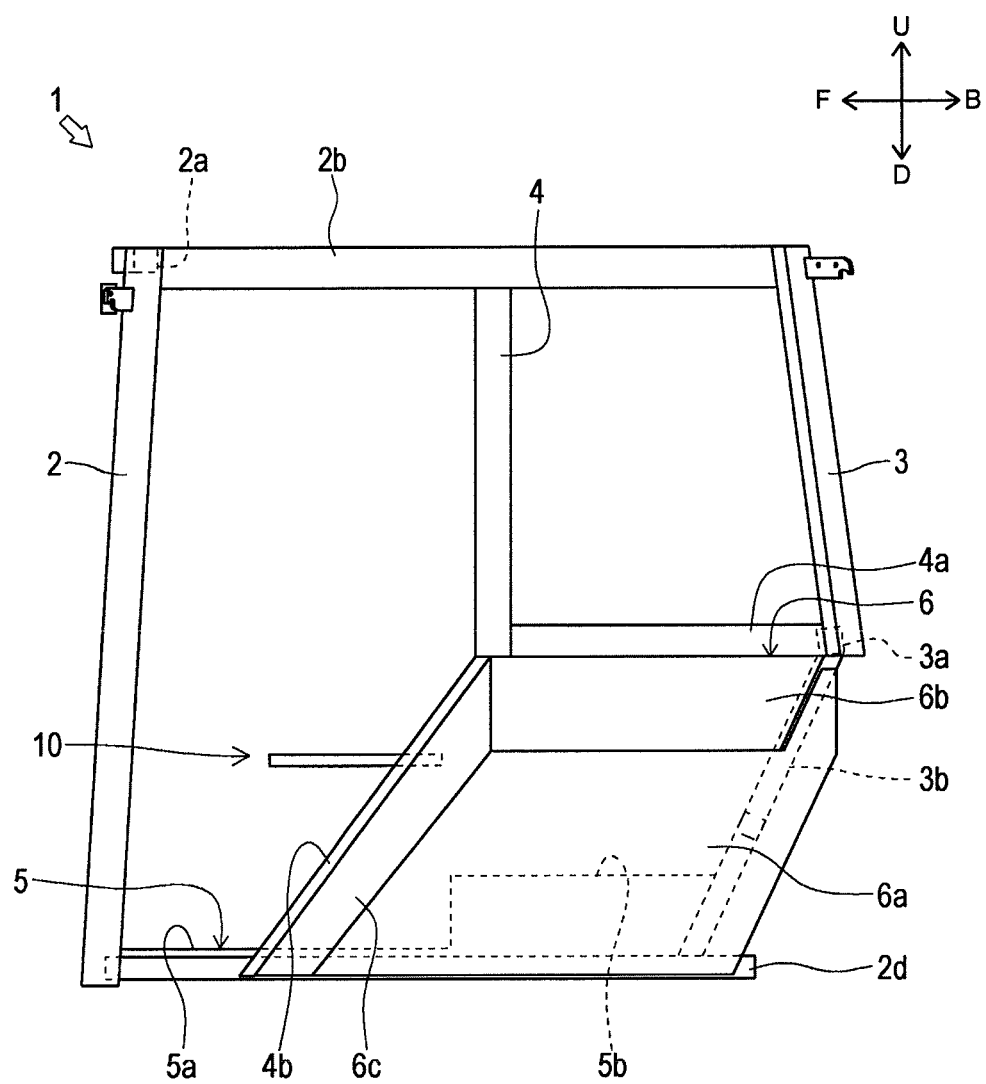
FIG. 2 is a side view illustrating the cabin frame in which the seat device is provided.

The seat device 10 allows a person (hereinafter, referred to as a "worker") other than a driver driving a tractor to sit in a cabin of the tractor. As illustrated in FIGS. 1 and 2, the seat device 10 is provided in a cabin frame 1 of the cabin.

First, the cabin frame 1 is described.

The cabin frame 1 has a pair of left and right front pillars 2, a pair of left and right rear pillars 3, and a pair of left and right intermediate pillars 4.

The pair of left and right front pillars 2 are arranged with their longitudinal directions in substantially the up-down direction at a front end of the cabin frame 1. Upper ends of the pair of left and right front pillars 2 are coupled to each other by a front upper frame member 2a that is oriented with its longitudinal direction in the left-right direction. Upper ends of the pair of left and right front pillars 2 are respectively coupled to the pair of left and right rear pillars 3 and the pair of left and right intermediate pillars 4 via a pair of left and right side upper frame members 2b that are oriented with their longitudinal directions in the front-rear direction. Lower ends of the pair of left and right front pillars 2 are coupled to each other via a lower front face frame 2c. A windshield is fitted between the pair of left and right front pillars 2.

The pair of left and right rear pillars 3 are arranged at a rear end of the cabin frame 1 with their longitudinal directions in substantially the up-down direction. Upper ends of the pair of left and right rear pillars 3 are coupled to each other via a frame member that is not illustrated in the drawings. Lower ends of the pair of left and right rear pillars 3 are arranged at up-down direction middle parts of the pair of left and right front pillars 2 and are coupled to each other via a rear lateral frame member 3a that is oriented with its longitudinal direction in the left-right direction. The pair of left and right rear pillars 3 are respectively coupled to the pair of left and right front pillars 2 via a pair of left and right lower rear pillars 3b and a pair of left and right side lower frame members 2d. The pair of left and right lower rear pillars 3b are attached to the rear lateral frame member 3a and extend in a forward-downward direction. The pair of left and right side lower frame members 2d are attached to the lower front face frame 2c and extend in the rearward direction. A rear window is fitted between the pair of left and right rear pillars 3.

The pair of left and right intermediate pillars 4 are arranged with their longitudinal directions oriented in the up-down direction at a front-rear direction middle part of the cabin frame 1. Lower ends of the pair of left and right intermediate pillars 4 are respectively coupled to the lower ends of the pair of left and right rear pillars 3 via a pair of left and right intermediate side frame members 4a that are oriented with their longitudinal directions in the front-rear direction. The pair of left and right intermediate pillars 4 are respectively coupled to the pair of left and right front pillars 2 via a pair of left and right lower intermediate pillars 4b and the like, with the pair of left and right lower intermediate pillars 4b extending in the forward-downward direction from the lower ends of the pair of left and right intermediate pillars 4.

In the cabin frame 1 that is configured as described above, fenders covering front and upper sides of the rear wheels of the tractor are attached to the pair of left and right intermediate side frame members 4a and the pair of left and right lower intermediate pillars 4b. In the cabin frame 1, doors operable to open and close are fitted between the pair of left and right front pillars 2 and the pair of left and right intermediate pillars 4. In the cabin frame 1, side windows are fitted between the pair of left and right rear pillars 3 and the pair of left and right intermediate pillars 4.

As illustrated in FIG. 2, such a cabin frame 1 includes a floor sheet 5 and a pair of left and right tire housing formation members 6.

The floor sheet 5 configures a floor of the cabin. The floor sheet 5 is arranged at a lower part of the cabin frame 1. In a front part of the floor sheet 5, a step 5a is formed as a part where a driver and a worker place their feet. In a rear part of the floor sheet 5, a driver seat arrangement part 5b is formed one step higher than the step 5a. In the floor sheet 5, a driver seat where a driver sits is provided in the driver seat arrangement part 5b.

The pair of left and right tire house formation members 6 form tire receiving or accommodating spaces (housing spaces) for the rear wheels. The pair of left and right tire house formation members 6 are respectively arranged at a left part and a right part of the cabin frame 1. The pair of left and right tire house formation members 6 are configured using a plate material. The pair of left and right tire house formation members 6 each include a vertical wall part 6a, an upper inclined wall part 6b and a front inclined wall part 6c. The pair of left and right tire house formation members 6 are configured so as to be left-right symmetrical. Therefore, in the following description, the left tire house formation member 6 is described, and description of the right tire house formation member 6 is omitted.

The vertical wall part 6a is a part that extends upward from the left side lower frame member 2d. The vertical wall part 6a is arranged on a more inner side of the cabin frame 1 in the left-right direction than the left intermediate side frame member 4a and the left lower intermediate pillar 4b.

The upper inclined wall part 6b is arranged between the vertical wall part 6a and the left intermediate side frame member 4a. The upper inclined wall part 6b is formed in an inclined shape that extends outward in the left-right direction while extending upward, and connects the vertical wall part 6a and the left intermediate side frame member 4a.

The front inclined wall part 6c is arranged between the vertical wall part 6a and the left lower intermediate pillar 4b. The front inclined wall part 6c is formed in an inclined shape that extends outward in the left-right direction while extending from the vertical wall part 6a toward the left lower intermediate pillar 4b, and connects the vertical wall part 6a and the left lower intermediate pillar 4b.

The seat device 10 is attached or coupled to the front inclined wall part 6c of such a left tire house formation member 6. That is, the seat device 10 is installed in the left part of the cabin frame 1.

Next, a configuration of the seat device 10 is described.

Figure 3:
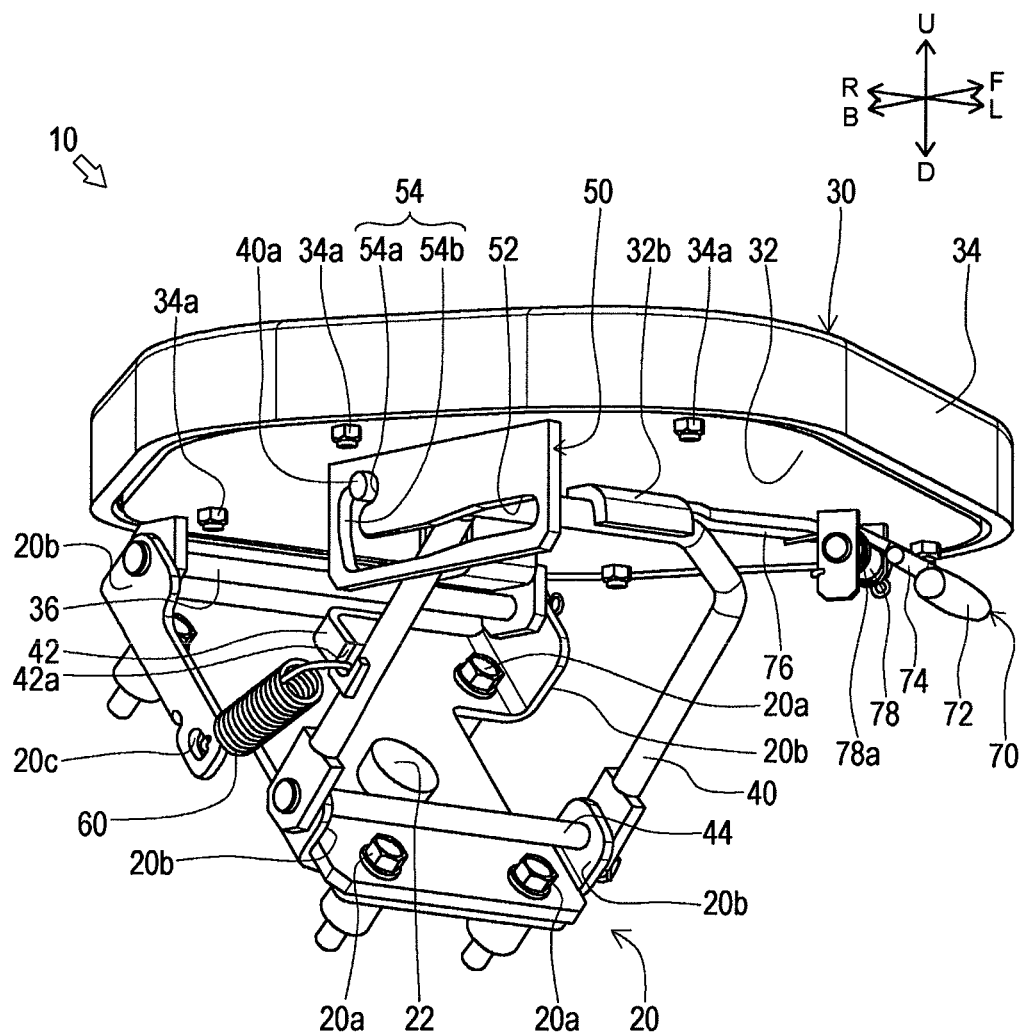
FIG. 3 is a perspective view illustrating the seat device.
Figure 4:
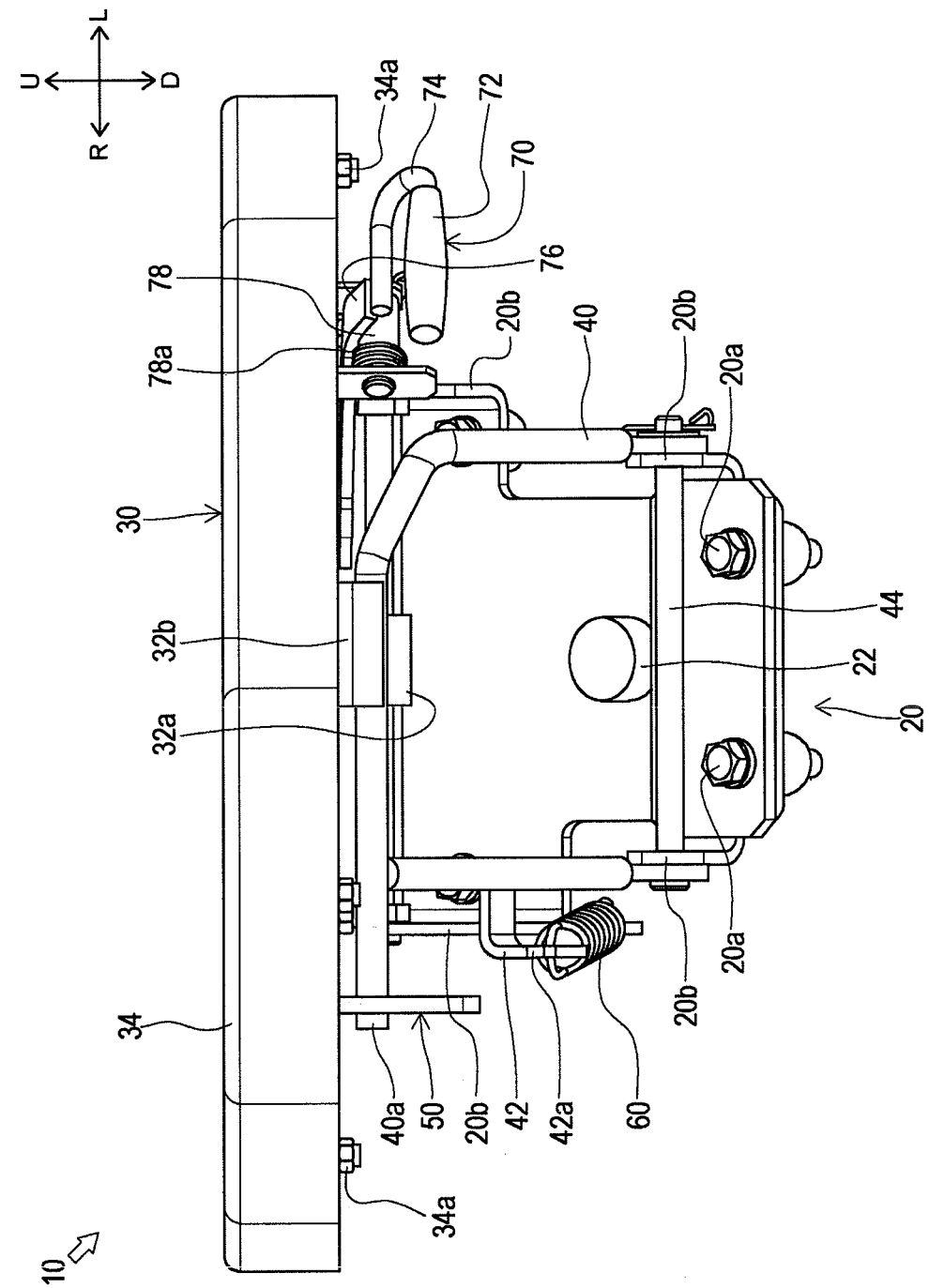
FIG. 4 is a front view illustrating the seat device.

As illustrated in FIGS. 3 and 4, the seat device 10 includes a frame 20, a seat part 30, a seat support 40, a guide member 50, a spring 60, and a lever 70.

The frame 20 is arranged such that a plate surface thereof is facing a forward-upward direction. The frame 20 is fixed to the front inclined wall part 6c (see FIG. 2) via bolts 20a. The frame 20 is formed in a shape in which two left and right side end parts of an upper part and two left and right end parts of a lower part are bent toward the forward-upward direction. The bent parts of the frame 20 are formed as bent parts 20b. A hole 20c is formed on the right upper side bent part 20b of the frame 20 penetrating therethrough in the left-right direction. Such a frame 20 includes a rubber part 22.

The rubber part 22 is attached to a left-right direction middle part of a lower part of the frame 20, and projects from the plate surface of the frame 20 in the forward-upward direction.

The seat part 30 is where a worker sits. The seat part 30 includes a base plate 32, a cushion 34 and an axle or rotation shaft 36.

Figure 5:
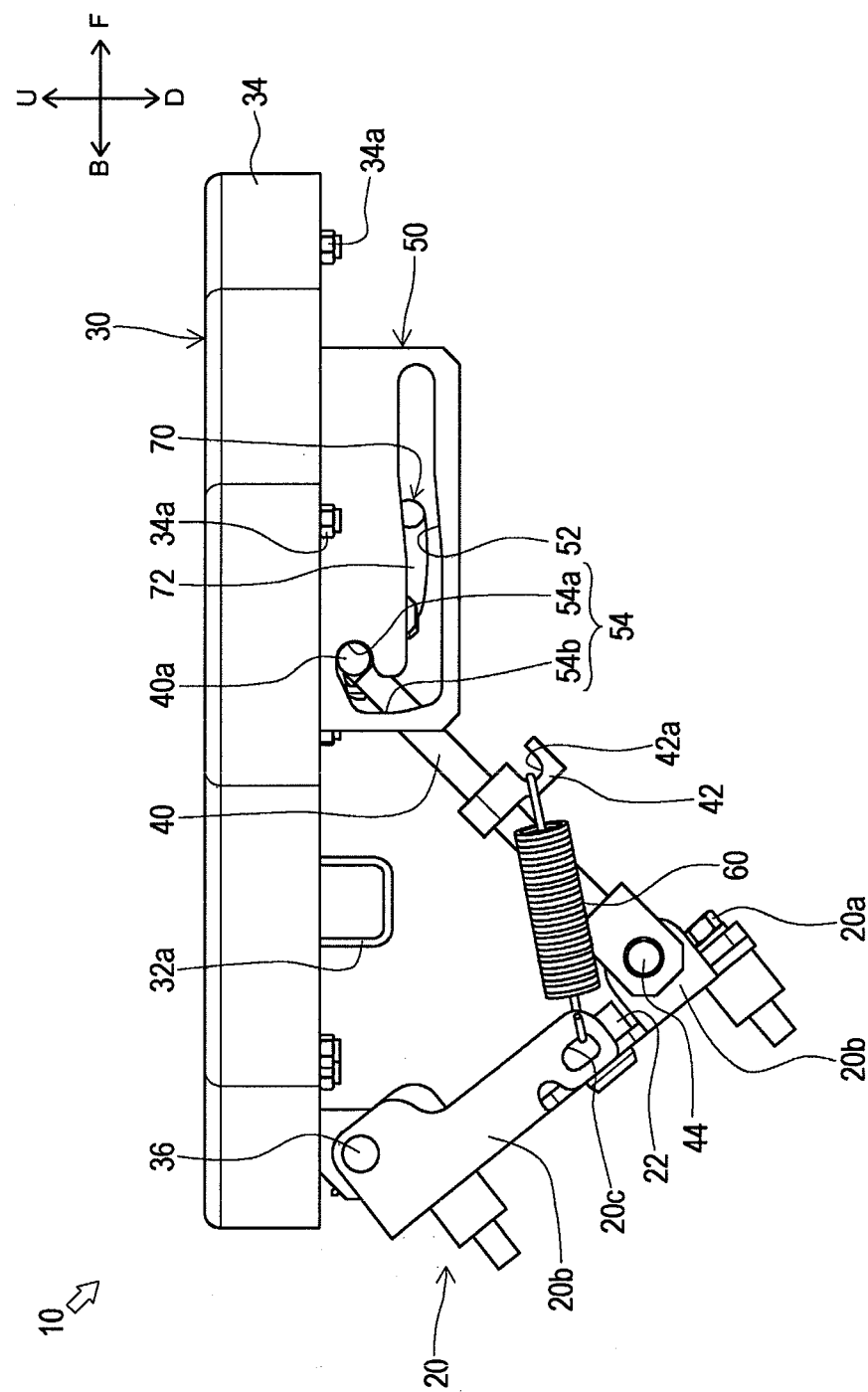
FIG. 5 is a side view illustrating the seat device.

The base plate 32 is a plate-like member of a substantially polygonal shape in a plan view, and is arranged at a lower part of the seat part 30. The base plate 32 is supported by the frame 20 via the rotation shaft 36. As illustrated in FIGS. 3 and 5, the base plate 32 has a first abutment member 32a and a second abutment member 32b.

The first abutment member 32a is formed in substantially a U-shape in a side view in which a front part and a rear part of a plate-like member are bent upward. The first abutment member 32a is attached to a lower surface of the base plate 32, and is arranged at a left-right direction middle part of a rear part of the base plate 32.

The second abutment member 32b is formed in substantially an L-shape in a side view in which a front part of a plate-like member is bent downward. The second abutment member 32b is attached or mounted to the lower surface of the base plate 32, and is arranged at the left-right direction middle part of a front part of the base plate 32.

The cushion 34 is formed in a substantially polygonal shape in a plan view. The cushion 34 is attached to an upper surface of the base plate 32 via one or more nuts 34a and a core material (not illustrated in the drawings).

The rotation shaft 36 is arranged at a rear end of the seat part 30. The rotation shaft 36 is oriented with its axial direction in the left-right direction and is attached or coupled to the two left and right upper side bent parts 20b and to brackets fixed on the base plate 32. The rotation shaft 36 rotatably couples the base plate 32 to the frame 20.

For the seat part 30 configured as described above, by rotating the rear end of the seat part 30 about the rotation shaft 36, a front end of the seat part 30 swings upward and downward. The first abutment member 32a is arranged such that, when the seat part 30 is swung downward, the first abutment member 32a and the rubber part 22 of the frame 20 are in contact with each other.

Figure 9A:
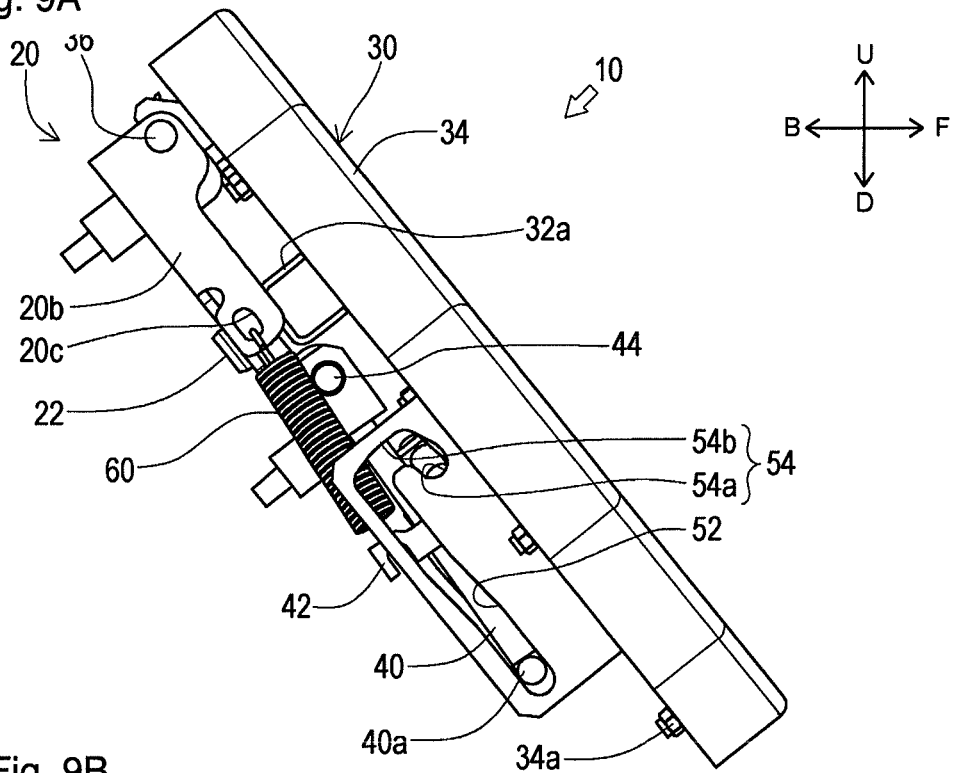
FIGS. 9A and 9B illustrate the seat device in a state in which the seat part has been changed to a non-use posture.

By swinging the seat part 30 upward, an upper surface of the cushion 34 faces upward and the seat part 30 is in a posture such that the worker can sit thereon. In the following, such a posture that allows the worker to sit on the seat part 30 is referred to as a deployed or "use posture." Further, by swinging the seat part 30 downward, a front end of the cushion 34 becomes close to the frame 20 and the seat part 30 is in a posture such that the worker cannot sit thereon (see FIG. 9A). In the following, such a posture that does not allow the worker to sit on the seat part 30 is referred to as a stowed, non-deployed or "non-use posture."

FIGS. 3 to 6 illustrate a state in which the seat part 30 is in the use posture. For ease of description, the following description assumes a state in which the seat part 30 has been changed or moved to the use posture.

The seat support 40 supports the seat part 30 in the state in which the seat part 30 has been changed to the use posture. As illustrated in FIGS. 4 and 5, the seat support 40 is formed in a shape in which rear ends of the seat support 40 respectively extend from a left part and a right part of the frame 20 in the forward-upward direction, and a front upper end of the left part extends so as to project rightward from the frame 20. In the state in which the seat part 30 has been changed to the use posture, a left-right direction middle part of the front upper end of the seat support 40 is in contact with the downwardly bent part of the second abutment member 32b of the seat part 30. As a result, the seat support 40 supports the seat part 30 so that the seat part 30 is not swingable downward, the seat part 30 being in the use posture. A sliding part 40a is formed in or arranged on such a seat support 40.

The sliding part 40a is a portion that projects rightward from the frame 20. The sliding part 40a is formed in a substantially cylindrical shape with an axis in the left-right direction. In the state in which the seat part 30 has been changed to the use posture, the sliding part 40a is inserted into a regulation groove 54 of the guide member 50 (to be described later).

The seat support 40 configured as described above includes a bracket 42 and an axle or rotation shaft 44.

The bracket 42 is a substantially L-shaped member in which a right part of a plate-like member is bent in a forward-downward direction. A left part of the bracket 42 is attached to an up-down direction middle part on the right side of the seat support 40. A cutout part 42a having a substantially U-shape in a side view is formed on a front lower part of the bracket 42.

The rotation shaft 44 is arranged on a front lower part of the frame 20. The rotation shaft 44 is oriented with its axial direction in the left-right direction and is attached to the two left and right lower side bent parts 20b and to the rear end of the seat support 40. The rotation shaft 44 rotatably or swingly couples the seat support 40 to the frame 20.

For the seat support 40 configured as described above, by rotating the rear end of the seat support 40 about the rotation shaft 44, the front upper end of the seat support 40 swings upward and downward.

The guide member 50 is a substantially plate-like member oriented with its longitudinal direction in the front-rear direction and its lateral direction in the up-down direction. The guide member 50 is fixed on the lower surface of the seat part 30. The guide member 50 is arranged on a right part of the seat part 30. A free groove 52 and the regulation groove 54 are formed in such a guide member 50.

Figure 6:
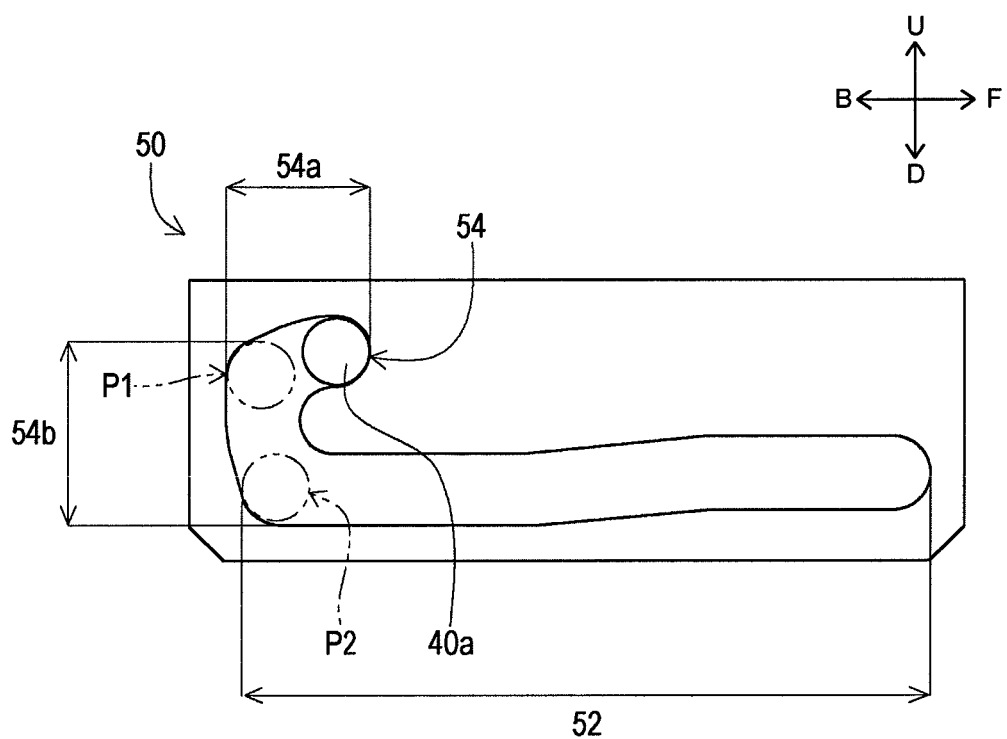
FIG. 6 is an enlarged side view illustrating a guide member and a sliding part.

As illustrated in FIG. 6, the free groove 52 is a portion formed to extend from a front part of the guide member 50 to a rear part in substantially the front-rear direction. The free groove 52 penetrates or extends through the guide member 50 in the left-right direction. The free groove 52 is formed in a shape that allows the sliding part 40a to be slidable therein accompanying the swinging of the seat support 40. The free groove 52 is arranged at a position lower than the second abutment member 32b in a side view (see FIG. 9B). In the state in which the seat part 30 has been changed to the non-use posture, the sliding part 40a is arranged at a front part of the free groove 52 (see FIG. 9A).

The regulation groove 54 regulates the sliding of the sliding part 40a in the state in which the seat part 30 has been changed to the use posture. The regulation groove 54 penetrates or extends through the guide member 50 in the left-right direction. A first groove or groove section 54a and a second groove or groove section 54b are formed in the regulation groove 54.

The first groove 54a is a portion that is formed above a rear end of the free groove 52. The first groove 54a is arranged above all of the free groove 52. A first end (front end) of the first groove 54a is formed in a semicircular shape that follows an outer shape of the sliding part 40a. The first end of the first groove 54a engages with the sliding part 40a in the state in which the seat part 30 has been changed to the use posture. The second abutment member 32b is arranged on a left side of the first end of the first groove 54a (see FIG. 9B). The first groove 54a is formed to extend from the first end in a backward-downward direction, and a second end (see a point P1 illustrated in FIG. 6) of the first groove 54a, the second end extending in the backward-downward direction, is connected to the second groove 54b.

The second groove 54b connects the free groove 52 and the first groove 54a. The second groove 54b is formed to extend substantially downward from the second end of the first groove 54a. The second groove 54b is formed in a shape that allows the sliding part 40a to be slidable therein accompanying the swinging of the seat support 40. An end (see a point P2 illustrated in FIG. 6) of the second groove 54b, the end extending substantially downward, is connected to the rear end of the free groove 52.

The guide member 50 guides the sliding part 40a via the free groove 52 or the regulation groove 54 accompanying the upward and downward swinging of the seat part 30 and the seat support 40.

As illustrated in FIGS. 3 and 5, the spring 60 is a spring that pulls or tensions the seat support 40. A rear end of the spring 60 is attached to a hole 20c of the frame 20. A front end of the spring 60 is attached to a cutout part 42a of the bracket 42 of the seat support 40. In the state in which the seat part 30 has been changed to the use posture, the spring 60 is in a state of being oriented with its longitudinal direction in a direction that is slightly inclined upward with respect to the forward direction. In this case, a front-rear direction middle part of the spring 60 is arranged above the rotation shaft 44 in a side view.

In the state in which the seat part 30 has been changed to the use posture, such a spring 60 biases the seat support 40 in substantially the rearward direction by pulling on the seat support 40. Thus, in the state in which the seat part 30 has been changed to the use posture, the spring 60 biases the seat support 40 to swing upward. By swinging the seat support 40 downward, the front-rear direction middle part of the spring 60 moves downward. When the seat part 30 is changed to the non-use posture (more specifically, when the sliding part 40a slides along the front-rear direction middle part of the free groove 52), in a side view, the front-rear direction middle part of the spring 60 moves from above the rotation shaft 44 to below the rotation shaft 44 (crosses a dead point). Therefore, in the state in which the seat part 30 has been changed to the non-use posture, the spring 60 biases the seat support 40 to swing downward by pulling on the seat support 40 (see FIG. 9A).

The lever 70 is used to release the use posture of the seat part 30. As illustrated in FIGS. 3 and 4, the lever 70 is arranged below a left front part of the seat part 30. The lever 70 includes a grip 72, a coupling member 74, an abutment member 76 and a rotation shaft 78.

The grip 72 is a portion that a worker (or other user) holds to operate the lever 70. The grip 72 is arranged near a front end (near a left front end) of the seat part 30 and covers a front part of the coupling member 74. The grip 72 is upward-and-downward swingably supported on the rotation shaft 78 via the coupling member 74 and the abutment member 76.

The coupling member 74 is a substantially U-shaped member that couples the grip 72 and the abutment member 76. The abutment member 76 is attached to a rear part of the coupling member 74.

The abutment member 76 is a plate-like member that extends from the coupling member 74 toward the seat support 40. A rear end of the abutment member 76 is arranged above a front upper end of the seat support 40. A front part of the abutment member 76 is attached to the rotation shaft 78. By swinging the grip 72 upward, the rear end of the abutment member 76 is swung downward. Thus, the abutment member 76 is configured to be in contact with the front upper end of the seat support 40 and capable of swinging the seat support 40 downward.

In a state in which the axial direction of the rotation shaft 78 is oriented in a leftward-backward direction, the rotation shaft 78 is attached to the base plate 32 of the seat part 30 via brackets that are fixed on the base plate 32. A spring 78a is provided on the rotation shaft 78. The spring 78a of the rotation shaft 78 constantly biases or applies torsion to the front part of the abutment member 76 in a downward direction.

Next, a description is given of an operation performed when the posture of the seat part 30 of the seat device 10 is changed. In the following description, it is assumed that the worker changes the posture of the seat part 30.

First, a description is given of an operation performed when the seat part 30 in the state in which the seat part 30 has been changed to the use posture is changed to the non-use posture.

As described above, in the state in which the seat part 30 has been changed to the use posture, the sliding part 40a engages with the first groove 54a of the regulation groove 54. Further, the front upper end of the seat support 40 is in contact with the second abutment member 32b.

Figure 7A:
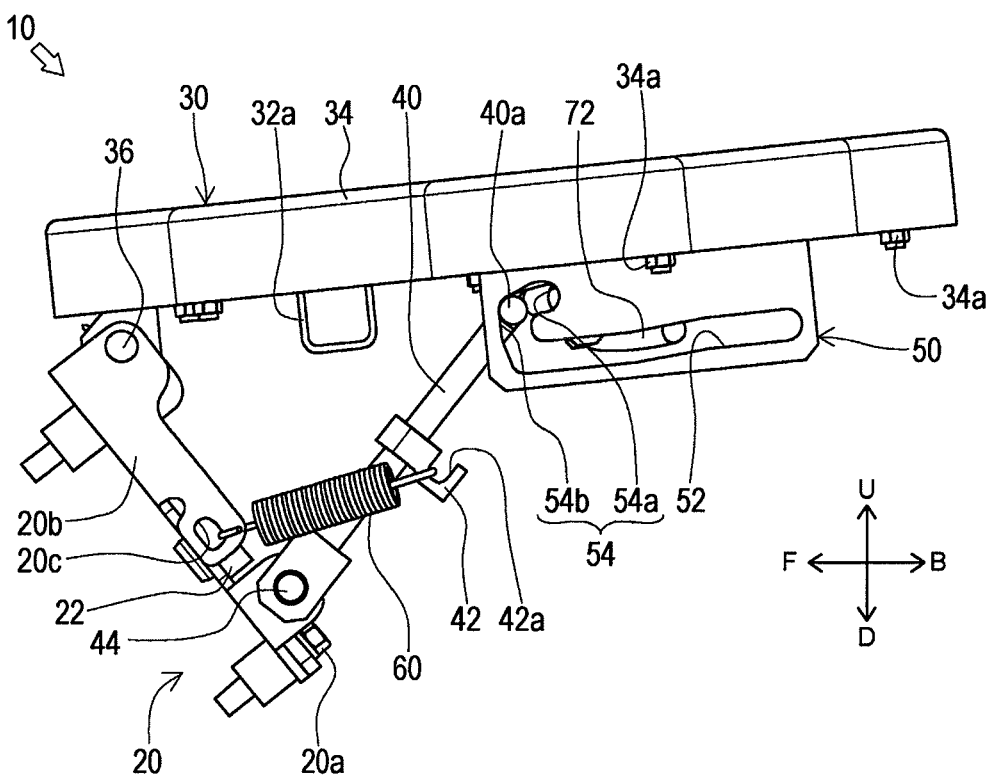
FIGS. 7A and 7B illustrate the seat device in a state in which a seat part is lifted.
Figure 7B:
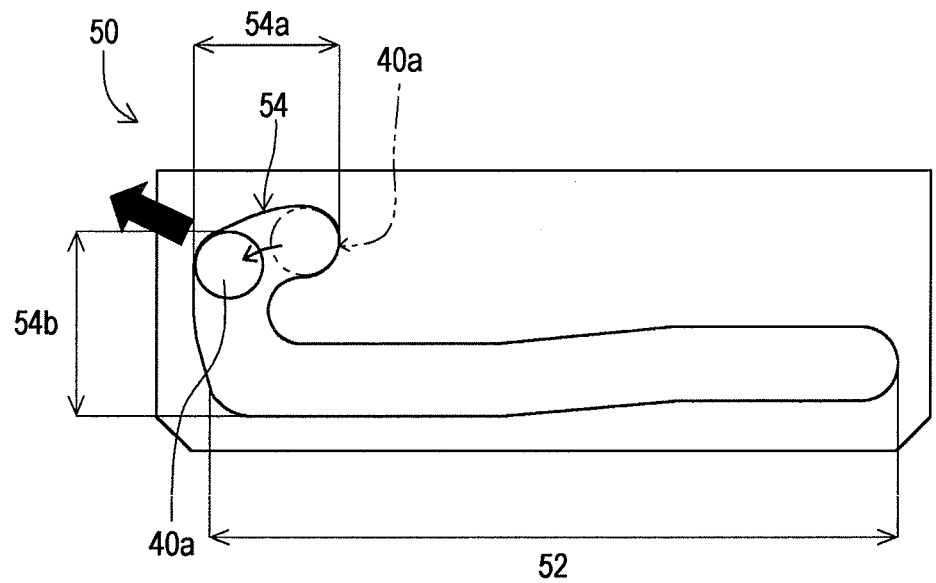

As illustrated in FIGS. 5, 7A and 7B, when changing the seat part 30 to the non-use posture, the worker lifts the seat part 30 to swing the seat part 30 upward. As a result, the worker causes the sliding part 40a to slide from the first end to the second end of the first groove 54a. Thus, the worker releases the engagement state between the sliding part 40a and the first groove 54a and releases the contact state between the second abutment member 32b and the front upper end of the seat support 40 (see the sliding part 40a illustrated in FIG. 7B, and FIGS. 9A and 9B).

Then, as illustrated in FIGS. 7A-8B, while the seat part 30 is lifted up, the worker swings the grip 72 of the lever 70 upward. As a result, the worker causes the abutment member 76 of the lever 70 (see FIGS. 3 and 4) to be in contact with the front right end of the seat support 40 and the seat support 40 to swing downward against the biasing force of the spring 60 (see an arrow illustrated in black in FIG. 7B). By performing such an operation of the lever 70, the worker causes the seat support 40 to swing downward relative to the seat part 30.

Figure 8A:
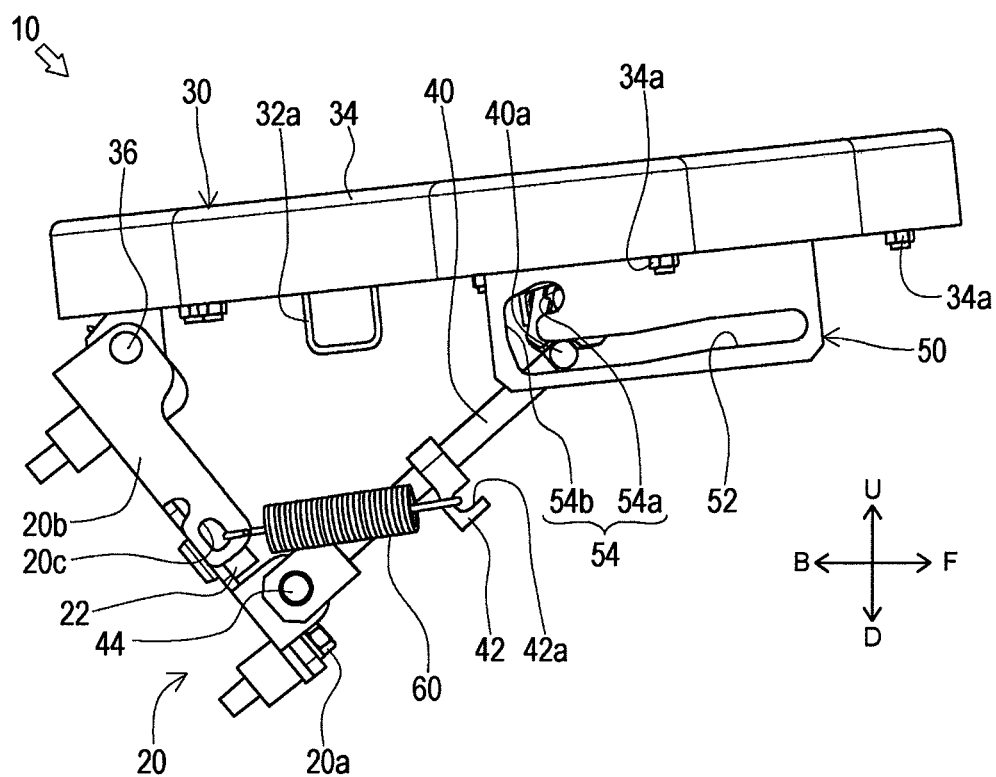
FIGS. 8A and 8B illustrate the seat device in a state in which a lever is operated.
Figure 8B:
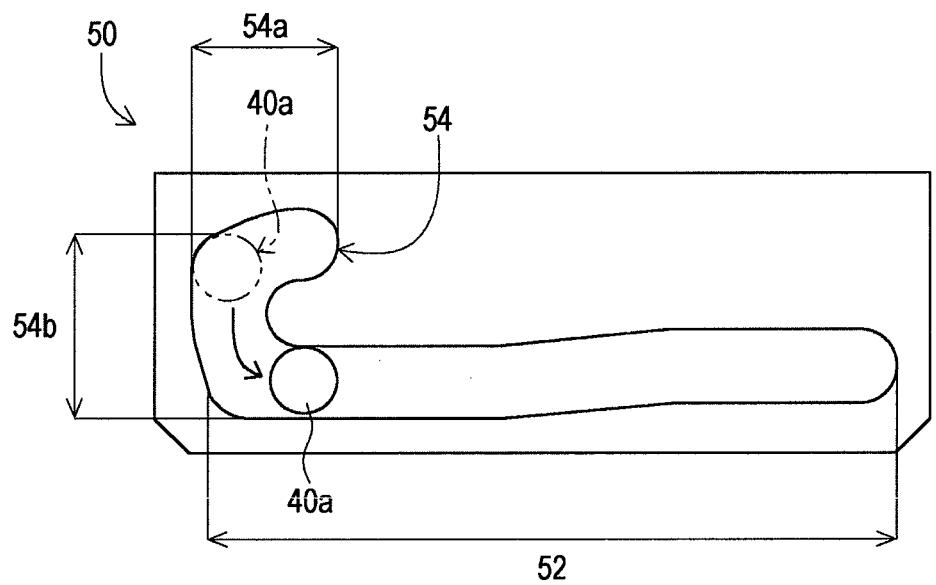

Thus, the worker causes the sliding part 40a to slide from the second end of the first groove 54a and via the second groove 54b to the free groove 52 (see the sliding part 40a illustrated in FIG. 8B).

Thereafter, the worker releases the lifting operation of the seat part 30 and the operation of the lever 70. As a result, as illustrated in FIGS. 8A-9B, the worker causes the seat part 30 to swing downward by its own weight. In this case, the front upper end of the seat support 40 passes below the second abutment member 32b of the seat part 30 to move to a front side of the second abutment member 32b. Thus, the worker causes the sliding part 40a to slide along the free groove 52 and the seat support 40 to swing downward (see an arrow illustrated inside the free groove 52 in FIG. 9B).

By causing the sliding part 40a to slide to the front part of the free groove 52, the worker changes the seat part 30 to the non-use posture.

As described above, the worker can easily change the seat part 30 of the seat device 10 to the non-use posture by only operating the lever 70 once.

Further, the seat device 10 has a configuration in which the worker changes the seat part 30 to the non-use posture by performing a lifting operation of the seat part 30 and an operation of the lever 70. Therefore, the seat part 30 can be reliably prevented from changing or moving to the non-use posture at a time that is not intended by the worker. Therefore, the seat part 30 of the seat device 10 can be reliably held in the use posture. For example, even when the seat part 30 is lifted due to vibration and the like, as long as the lever 70 is not operated, the seat part 30 is not changed to the non-use posture. Further, even when the lever 70 is inadvertently operated, as long as the seat part 30 is not lifted, the seat part 30 is not changed to the non-use posture.

Figure 9B:
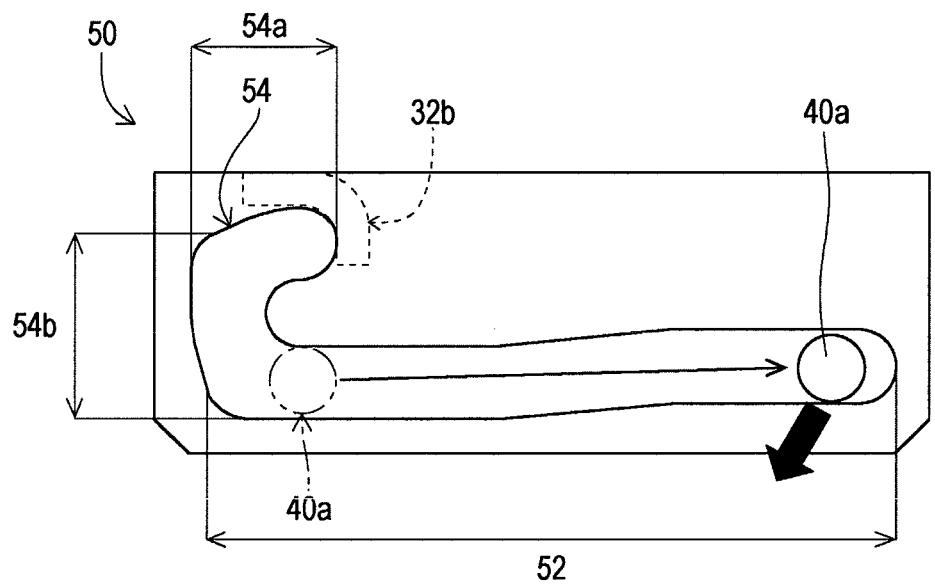

As described above, the seat device 10 has a configuration in which, when the sliding part 40a slides along the front-rear direction middle part of the free groove 52, the dead point is crossed and the seat support 40 is biased to swing downward by the pulling of the spring 60 (see the black arrow illustrated in FIG. 9B).

According to this, when the seat part 30 of the seat device 10 is changed to the non-use posture, the seat part 30 can be biased to swing downward due to the spring 60. Therefore, in the state in which the seat part 30 of the seat device 10 has been changed to the non-use posture, the seat part 30 can be prevented from swinging upward due to vibration and the like when the tractor is traveling. Therefore, the seat part 30 of the seat device 10 can be stably held in the non-use posture.

Thus, in the state in which the seat part 30 has been changed to the non-use posture, the spring 60 biases the seat support 40 so that the sliding part 40a is held in the free groove 52, that is, so that the sliding part 40a moves to the front part of the free groove 52.

As described above, the grip 72 of the lever 70 is arranged near the front end of the seat part 30, that is, near an outer edge of the seat part where the grip 72 can be easily gripped by the worker. According to this, when changing the seat part 30 of the seat device 10 to the non-use posture, the worker can swing the lever 70 in a comfortable posture. Therefore, the seat device 10 can have a configuration that allows the worker to easily perform the operation of the lever 70 and the lifting (swinging) operation of the seat part 30.

Further, in the seat device 10, the first abutment member 32a is arranged at a position in contact with the rubber part 22 when the seat part 30 has been swung downward. As a result, in the seat device 10, the frame 20 and the seat part 30 are in contact with each other via the rubber part 22, and an impact that occurs when the seat part 30 is changed to the non-use posture can be suppressed.

Further, in the seat device 10, in the state in which the seat part 30 has been changed to the non-use posture, predetermined spaces are formed between the seat support 40 and the frame 20 and other parts such as the seat part 30. Thus, the seat device 10 has a configuration in which the seat support 40 does not become a hindrance when the lever 70 is operated so that the lever 70 can be more easily operated.

Next, a description is given of an operation performed when the seat part 30 in the state in which the seat part 30 has been changed to the non-use posture is changed to the use posture.

As described above, when the seat part 30 is in the non-use posture, the sliding part 40a is arranged at the front part of the free groove 52.

When changing the seat part 30 to the use posture, the worker lifts the seat part 30 to swing the seat part 30 upward. As a result, the worker causes the seat support 40 to swing upward and the sliding part 40a to slide from the front part of the free groove 52 to the rear end of the free groove 52 (see FIGS. 8A and 8B).

Then, the worker further lifts the seat part 30 from the state illustrated in FIGS. 8A and 8B. As a result, the worker causes the sliding part 40a to slide from the rear end of the free groove 52 to the second groove 54b. Thereafter, the worker releases the lifting operation of the seat part 30.

As described above, the spring 60 crosses the dead point when the sliding part 40a slides along the front-rear direction middle part of free groove 52. Therefore, when the sliding part 40a slides in the second groove 54b, the spring 60 biases the seat support 40 to swing upward (see the black arrow illustrated in FIG. 7B).

As a result, in the seat device 10, when the worker releases the lifting operation of the seat part 30, the sliding part 40a is caused to slide such that it does not return to the free groove 52 (when the seat part 30 swings downward, the sliding part 40a slides from the second groove 54b to the first groove 54a). Thus, as illustrated in FIGS. 3 and 5, in the seat device 10, the sliding part 40a and the first groove 54a of the regulation groove 54 engage each other, the front upper end of the seat support 40 and the second abutment member 32b of the seat part 30 are in contact with each other, and the seat part 30 is held in the state in which the seat part 30 has been changed to the use posture. Thus, the worker can change the seat part 30 of the seat device 10 from the non-use posture to the use posture by simply lifting the seat part 30.

In the seat device 10, by biasing the seat support 40 using such a spring 60, even when the seat part 30 swings upward and the sliding part 40a slides to the second groove 54b due to vibration and the like when the tractor travels, the sliding part 40a can be returned to the first end of the first groove 54a (see the black arrow illustrated in FIG. 7B). Thus, the worker can change the seat part 30 of the seat device 10 to the use posture by simply lifting the seat part 30, and a stable use posture can be maintained.

As described above, in the state in which the seat part 30 has been changed to the use posture, the spring 60 biases the seat support 40 so that the sliding part 40a is held in the regulation groove 54, that is, so that the sliding part 40a is returned to the first groove 54a of the regulation groove 54 (the sliding part 40a does not slide to the free groove 52 when the seat part 30 swings upward).

Thus, in the state in which the seat part 30 has been changed to the use posture, the spring 60 biases the seat support 40 toward a swinging position (position of the sliding part 40a illustrated in FIG. 5) at which the seat part 30 can be supported. Further, in the state in which the seat part 30 has been changed to the use posture, the spring 60 biases the sliding part 40a in a direction different from a formation direction of the free groove 52 and the regulation groove 54 (more specifically, a formation direction of a portion that guides the sliding part 40a). As a result, the seat device 10 has a configuration in which the seat part 30 that has been changed to the use posture can be reliably held.

In the seat device 10 according to the present embodiment, the seat part 30 can be held in the use posture and the non-use posture by only the spring 60. Therefore, in the seat device 10, by simply swinging the seat part 30 upward and downward, the posture of the seat part 30 can be easily changed without separately performing an operation in order to hold the seat part 30.

Further, in the seat device 10 according to the present embodiment, the regulation groove 54 is formed in a folded-back shape with respect to the free groove 52. That is, the free groove 52 is formed so as to approach a swing pivot (that is, the rotation shaft 44) of the seat support 40 as the free groove 52 extends from the front part toward the rear end (an end connecting to the regulation groove 54), whereas the regulation groove 54 is formed so as to become distant from the rotation shaft 44 as the regulation groove 54 extends from the end (the end connecting to the free groove 52) of the second groove 54b (that extends in substantially the downward direction) toward the second end of the first groove 54a.

Figure 10A:
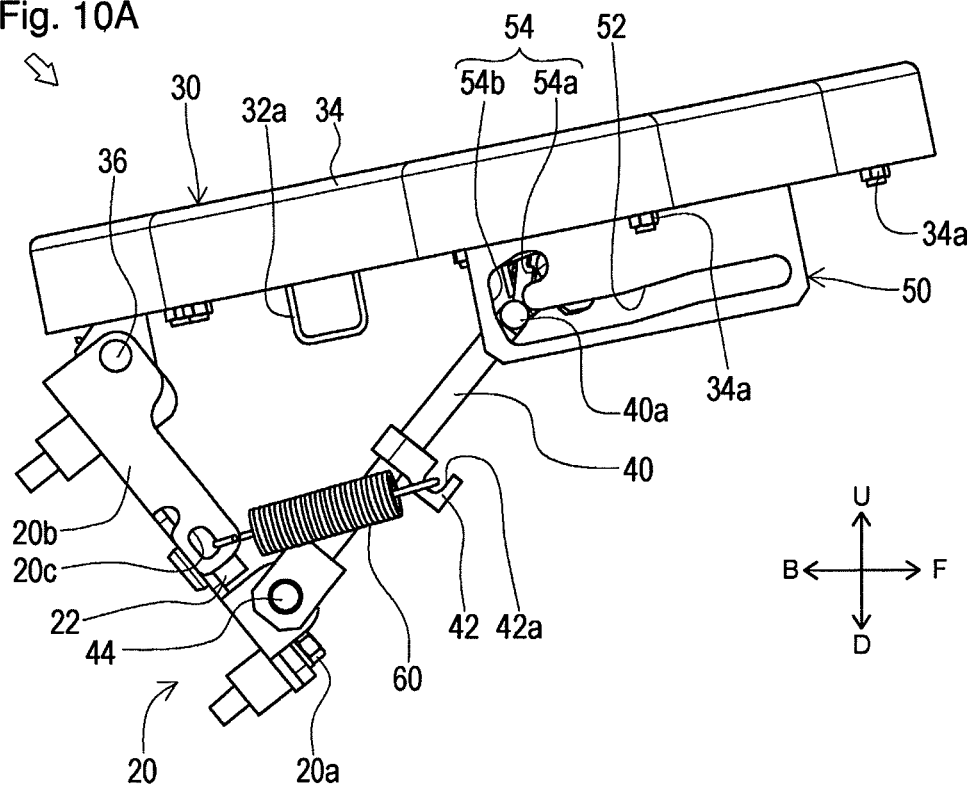
FIGS. 10A and 10B illustrate a state in which the sliding part is caught in a regulation groove.
Figure 10B:
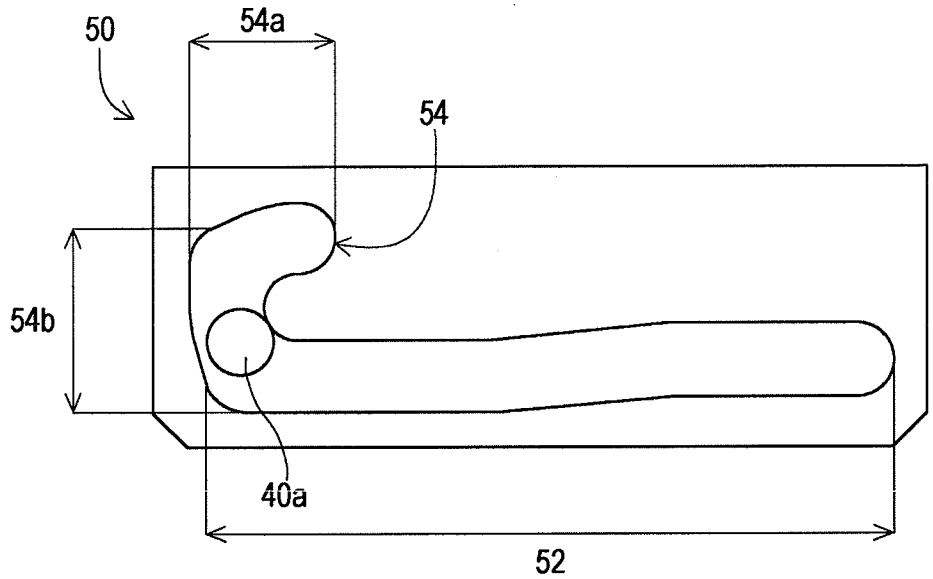

Therefore, in the seat device 10 according to the present embodiment, when the seat part 30 is changed to the use posture or the non-use posture, the seat part 30 is briefly put in a posture in which the seat part 30 is lifted upward from the use posture (see FIGS. 10A and 10B). Therefore, when the sliding part 40a is caught in the free groove 52 or the regulation groove 54 (when the sliding of the sliding part 40a is stopped), when the posture of the seat part 30 is changed, the seat part 30 is in a posture in which the seat part 30 has been lifted upward. Therefore, the worker can easily understand that the sliding part 40a is caught when the seat part 30 is inclined (is in a posture lifted upward), and can reliably change the posture of the seat part 30.

Non-Limiting Embodiments

Thus, the seat device 10 according to the present embodiment includes: the seat part 30 that is upward-and-downward swingably supported and is capable of changing the posture thereof to the use posture that allows sitting on the seat part 30 and to the non-use posture that does not allow sitting on the seat part 30; the seat support 40 (a support part) that is upward-and-downward swingably supported and supports the seat part 30 in the state in which the seat part 30 has been changed to the use posture; the guide member 50 (a guide part) in which the free groove 52 that slidably guides the sliding part 40a (a predetermined portion) of the seat support 40 and the regulation groove 54 that regulates sliding of the sliding part 40a in the state in which the seat part 30 has been changed to the use posture are formed, the guide member 50 being fixed on the seat part 30; the spring 60 (a biasing member) that biases the seat support 40 so that the sliding part 40a is held in the regulation groove 54 in the state in which the seat part 30 has been changed to the use posture; and the lever 70 (a release member) that causes the sliding part 40a to slide from the regulation groove 54 to the free groove 52 by causing the seat support 40 to swing downward (a first direction) against the biasing force of the spring 60.

By having such a configuration, the seat part 30 can be easily changed from the use posture to the non-use posture.

The first groove 54a and the second groove 54b are formed in the regulation groove 54. The first groove 54a regulates, at the first end thereof, the sliding of the sliding part 40a and guides the sliding part 40a to slide from the first end to the second end (see the point P1 illustrated in FIG. 6) accompanying the upward swinging of the seat part 30 that is in the state in which the seat part 30 has been changed to the use posture. The second groove 54b guides the sliding part 40a to slide from the end that is connected to the second end of the first groove 54a to the end (see the point P2 illustrated FIG. 6) that is connected to the free groove 52 accompanying the downward swinging of the seat support 40 due to the lever 70.

By having such a configuration, the seat part 30 can be reliably held in the use posture.

The spring 60 biases the seat support 40 so that the sliding part 40a is held in the free groove 52 in the state in which the seat part 30 has been changed to the non-use posture.

By having such a configuration, the seat part 30 can be stably held in the non-use posture.

The lever 70 is arranged near the outer edge of the seat part 30 and has the grip 72 (an operation part) that is operated by the worker.

By having such a configuration, the seat part 30 can be more easily changed from the use posture to the non-use posture.

Further, the seat device 10 includes: the seat part 30 that is upward-and-downward swingably supported and is capable of changing the posture thereof to the use posture that allows sitting on the seat part 30 and to the non-use posture that does not allow sitting on the seat part 30; the seat support 40 (the support part) that is upward-and-downward swingably supported and supports the seat part 30 in the state in which the seat part 30 has been changed to the use posture; the guide member 50 (the guide part) that is formed to extend in a predetermined direction, has the free groove 52 and the regulation groove 54 (a groove) capable of changing the seat part 30 to the use posture and to the non-use posture by slidably guiding the sliding part 40a (the predetermined portion) of the seat support 40, and is fixed on the seat part 30; and the spring 60 (the biasing member) that biases the seat support 40 toward the swinging position at which the seat support 40 can support the seat part 30 in the state in which the seat part 30 has been changed to the use posture. In the state in which the seat part 30 has been changed to the use posture, a direction along which the biasing force acts on the sliding part 40a due to the spring 60 and a formation direction of the free groove 52 and the regulation groove 54 are different.

By having such a configuration, the seat part 30 can be reliably held in the use posture.

As described above, the seat support 40 according to the present embodiment is an embodiment of the support part according to the present invention. The sliding part 40a according to the present embodiment is an embodiment of the predetermined portion of the support part according to the present invention. The guide member 50 according to the present embodiment is an embodiment of the guide part according to the present invention. The guide spring 60 according to the present embodiment is an embodiment of the biasing member according to the present invention. The lever 70 according to the present embodiment is an embodiment of the release member according to the present invention. The grip 72 according to the present embodiment is an embodiment of the operation part according to the present invention.

The direction along which the seat support 40 according to the present embodiment swings downward corresponds to the first direction along which the support part swings against the biasing force of the biasing member according to the present invention.

Figure 11:
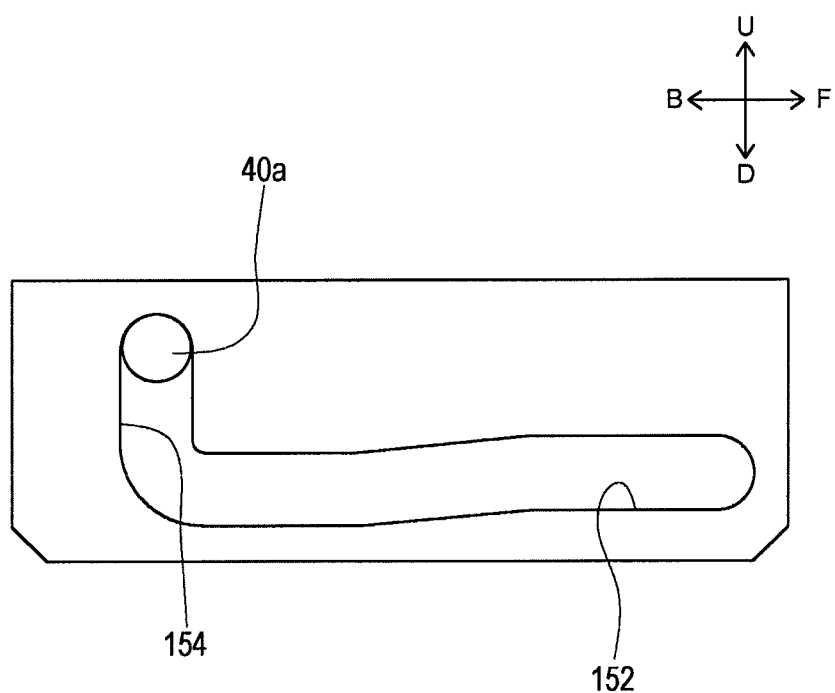
FIG. 11 is a side view illustrating a modified embodiment of the regulation groove.

The shape of the regulation groove 54 is not limited to the present embodiment. For example, as in a case of a regulation groove 154 illustrated in FIG. 11, it is also possible that the regulation groove has a shape that extends upward from the rear end of a free groove 152.

The configuration of the sliding part 40a is not limited to the present embodiment. For example, it is also possible that the sliding part 40a is configured by a pair of left and right projecting parts that respectively project to the left and right sides of the seat support 40. In this case, the projecting parts slide in free grooves and regulation grooves of a pair of left and right guide members that are respectively arranged on the left and right sides of the seat support 40.

It is not necessary that the sliding part 40a penetrates through the guide member 50 in the left-right direction.

It is not necessarily required that, in the seat device 10, the seat support 40 is biased by the spring 60.

It is also possible that the lever 70 is arranged at a right part of the seat part 30 or at another position that allows the lever 70 to be easily operated by the worker.

It is also possible that, in the seat device 10, a roller is attached to the sliding part 40a of the seat support 40. As a result, in the seat device 10, the sliding part 40a can smoothly slide.

It is also possible that the seat device 10 is provided in a right part of the cabin frame 1 of the tractor. Further, it is not necessary that the seat device 10 is provided in a tractor, but it is also possible that the seat device 10 is provided in other work vehicles and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A seat for a vehicle comprising:
a seat part that is generally upward-and-downward swingably supported and is capable of changing a posture thereof to a use posture that allows sitting on the seat part and to a non-use posture that does not allow sitting on the seat part, wherein the seat part has a front end and a rear end, and wherein in the non-use posture, the front end is arranged below the rear end;
a support part that is generally upward-and-downward swingably supported and that is configured to support the seat part when the seat part is in the use posture;
a guide part fixed to a bottom surface of the seat part and comprising:
 a free groove that slidably guides a predetermined portion of the support part; and
 a regulation groove that regulates sliding of the predetermined portion in a state in which the seat part has been changed to the use posture;
a biasing member that biases the support part so that the predetermined portion is held in the regulation groove in the state in which the seat part has been changed to the use posture; and
a release member configured to cause the predetermined portion to slide from the regulation groove to the free groove whereby the support part swings in first direction against a biasing force of the biasing member.

2. The seat device according to claim 1, wherein the regulation groove comprises a first groove section and a second groove section.

3. The seat device according to claim 2, wherein the first groove section is configured to regulate or guide a first movement of the predetermined portion during upward swinging of the seat part from the use posture.

4. The seat device according to claim 3, wherein the second groove section is configured to regulate or guide the predetermined portion after upward swinging of the seat part from the use posture.

5. The seat device according to claim 3, wherein the second groove section is configured to regulate or guide the predetermined portion after upward swinging of the seat part from the non-use posture.

6. The seat device according to claim 3, wherein the second groove section is configured to regulate or guide the predetermined portion during release of the release member.

7. The seat device according to claim 3, wherein the second groove section is configured to regulate or guide the predetermined portion as it moves between the first groove section and the free groove or vice versa.

8. The seat device according to claim 1, wherein the biasing member biases the support part so that the predetermined portion is held in the free groove in the state in which the seat part has assumed the non-use posture.

9. The seat device according to claim 2, wherein the biasing member biases the support part so that the predetermined portion is held in the free groove in the state in which the seat part has assumed the non-use posture.

10. The seat device according to claim 8, wherein the release member is arranged near an outer edge of the seat part and utilizes an operation part that can be accessed by a worker or user.

11. The seat device according to claim 9, wherein the release member is arranged near an outer edge of the seat part and utilizes an operation part that can be accessed by a worker or user.

12. The seat device according to claim 1, wherein the release member is arranged near an outer edge of the seat part and utilizes an operation part that can be accessed by a worker or user.

13. The seat device according to claim 2, wherein the release member is arranged near an outer edge of the seat part and utilizes an operation part that can be accessed by a worker or user.

14. The seat device according to claim 1, wherein the seat device is a passenger or auxiliary seat arranged in a vehicle cabin.

15. A vehicle seat comprising:
a seat part that is generally upward-and-downward swingably supported and is capable of moving between a use posture that allows sitting on the seat part and a non-use posture wherein the seat part is usable for sitting, wherein the seat part has a front end and a rear end, and wherein in the non-use posture, the front end is arranged below the rear end;
a support part that is generally upward-and-downward swingably supported and that is configured to assume a position supporting the seat part in the use posture;
a guide part fixed to a bottom surface of the seat part and comprising a groove configured to guide movement of a portion of the support part between the use posture and the non-use posture;
a biasing member that biases the support part during a swinging movement of the support part from use posture,
wherein, in the use posture, the biasing member is oriented along a first direction and the groove is oriented along a second direction that is different from the first direction.

16. The seat device according to claim 15, wherein the portion of the support part is prevented from engaging with the groove until a user activates a release member.

17. A work vehicle seat comprising:
a seat part that is swingably mounted and is capable of moving between an up deployed position allowing seating and a non-deployed and folded-down position, wherein the seat part has a front end and a rear end, and wherein in the non-deployed and folded-down position, the front end is arranged below the rear end;
a support that is swingably mounted and is capable of moving between a supporting position wherein the seat part is in deployed position and a non-supporting position wherein the seat part is in the non-deployed and folded-down position;
a guide fixed to a bottom side of seat part and comprising first and second groove sections configured to guide movement of a portion of the support between the up deployed position and the non-deployed and folded-down position;
a biasing member biasing the support toward the supporting position; and
a release member accessible to a user,
wherein the portion of the support engages with the first groove section at least when the seat part moves upward from the up deployed position, and
wherein the portion of the support is prevented from engaging with the second groove section until the user activates the release member.

18. The seat device according to claim 17, wherein the seat is a passenger or auxiliary seat arranged in a work vehicle cabin.

19. The seat device according to claim 1, wherein the support part is structured and arranged to rotate around a different axis than the seat part.

20. The seat device according to claim 1, wherein the biasing member is a spring.

* * * * *